United States Patent [19]

Beatty

[11] 4,049,882

[45] Sept. 20, 1977

[54] BATTERY ASSEMBLY

[75] Inventor: Theodore Robert Beatty, Cleveland, Ohio

[73] Assignee: Union Carbide Corporation, New York, N.Y.

[21] Appl. No.: 657,204

[22] Filed: Feb. 11, 1976

[51] Int. Cl.² .................................................. H01M 4/00
[52] U.S. Cl. ..................................... 429/94; 429/133; 429/164; 429/178
[58] Field of Search ........... 136/13, 14, 134 R, 134 P, 136/135 R, 135 S, 120 R; 429/94, 133–135, 136, 164–170, 178–184, 140, 141

[56] References Cited

U.S. PATENT DOCUMENTS

| 3,023,260 | 2/1962 | Coler et al. | 136/13 |
| 3,245,837 | 4/1966 | Ikeda et al. | 136/134 R |
| 3,393,095 | 7/1968 | Philipp | 136/14 |
| 3,496,018 | 2/1970 | Hamlen et al. | 136/134 P X |
| 3,732,124 | 5/1973 | Cailley | 136/13 |

Primary Examiner—C. F. LeFevour
Attorney, Agent, or Firm—Eugene Lieberstein

[57] ABSTRACT

The battery assembly incorporates a mechanical tab connection which has a multiplicity of projections for penetrating an electrode to form a mechanical joint and for simultaneously establishing electrical contact with the electrode through such joint.

8 Claims, 8 Drawing Figures

BATTERY ASSEMBLY

This invention relates to a sealed galvanic battery containing a coiled electrode assembly and more particularly to the electrical tab connections for coupling the coiled electrode assembly to the battery housing or other external terminal.

In the manufacture of a sealed battery employing coiled strips of electrode material it is the conventional practice to affix one or more tabs of conducting material to the strips in order to facilitate electrical contact between such strips of electrode material and the terminal locations on the battery outer housing.

Alkaline $MnO_2$ and nickel cadmium cells are typical of the battery cell types using coiled strips of electrode material. The procedures most commonly used in making strip electrodes include impregnating a sintered electrode metal plaque with the active ingredients and compacting the active ingredients, in powdered form, against an elongated strip of a conductive metal carrier grid. Although the former process is typically used for making both the anode and cathode electrode the latter process is, at present, generally limited to the fabrication of anode electrodes. A porous separator is placed between the strips of anode and cathode material or alternatively the strips are spaced apart and encapsulated within a sheath of porous separating material.

A necessary step in assembling the battery cell involves the placement and connection of the electrically conducting tabs to the electrode strips. This may occur before or after the incorporation of the separator. It is obvious that the joint formed between the tab and the strip may represent a substantial impedance if not adequately established. For this reason a bonded joint has heretofore been considered necessary, if not essential, particularly for high current cell performance. A bonded joint is formed by welding, soldering or brazing the parts together. Soldering and brazing are generally not acceptable procedures because of the potential for contamination by the joining metal. To perform an effective welding operation requires some surface preparation including the elimination of some of the active electrode ingredients within the area on the electrode strip to be welded. Such operation, if not carefully performed, may damage the surrounding area of the electrode, remove too much active material, or cause a short circuit upon assembly of the two electrode strips. An alternative to welding which is of low cost and equally effective has long been sought.

Assembly of the battery is completed after the tabs are joined to the strips of electrode material, by rolling the combined electrode strips and separator into a jelly-roll configuration and inserting the coiled structure into the battery housing. The tabs may then be connected in a conventional manner to their corresponding outer housing terminals or alternatively the tab for one of the electrodes, e.g., the positive tab may be welded to the top cover of the battery housing while the negative electrode tab may be bent back so that it mechanically and electrically engages the side wall of the housing under pressure upon insertion of the electrode assembly. An electrolyte of appropriate composition is introduced into the housing in any conventional manner either before or after the insertion of the coiled electrode strips.

It is the principal object of the present invention to provide a battery assembly in which at least one of the coiled strips of electrode material is mechanically joined to a conducting tab in a manner to provide a joint having an impedance substantially equal to that of a welded joint.

It is further object of the present invention to provide an improved battery assembly containing coiled strips of electrode material electrically coupled to the battery external terminals by conducting tabs at least one of which has a multiplicity of projections for mechanically and electrically engaging one of said coiled strips.

Other objects and advantages of the present invention will become apparent from the following detailed explanation of the invention when taken in connection with the accompanying drawings in which.

Figure 1:
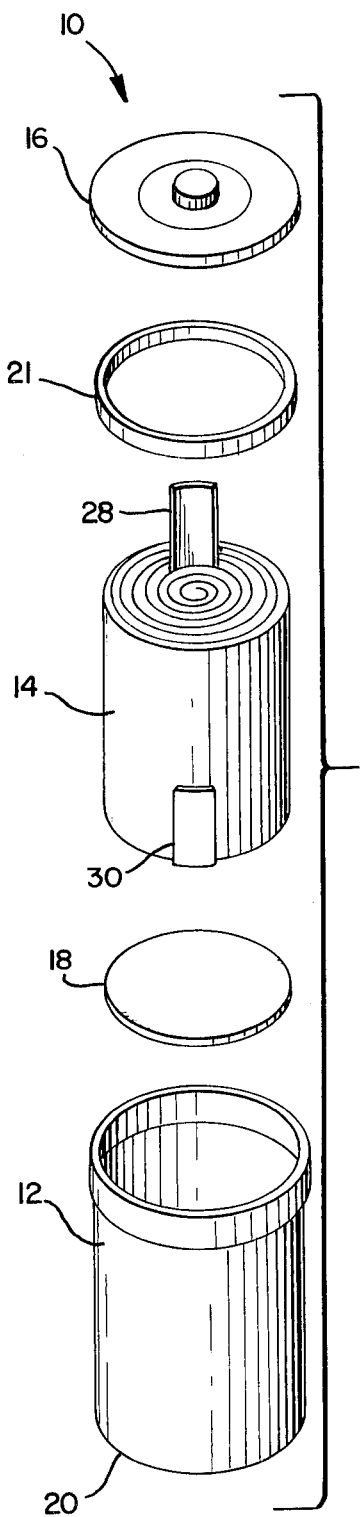
FIG. 1 is an exploded view of the battery assembly of the present invention.
Figure 3:
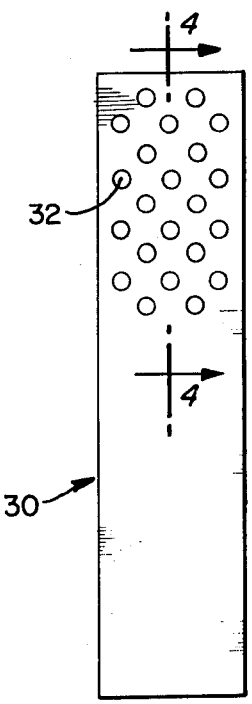
FIG. 3 is a plan view of the preferred tab element of the present invention.
Figure 4:
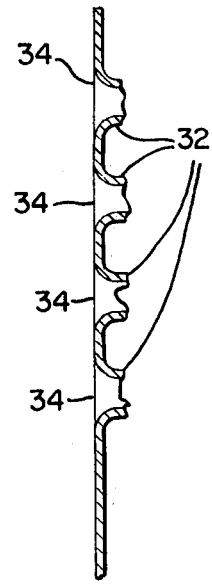
FIG. 4 is a side view of the preferred tab element of the present invention taken along the lines 4—4 of FIG. 3.

Referring to FIGS. 1-4 inclusive, in which the battery assembly 10 of the present invention is shown comprising; a battery housing 12 of generally cylindrical construction, a coiled electrode structure 14, a compatible electrolyte (not shown) and a cover plate 16. The coiled electrode structure 14 is formed from elongated strips of electrode material wound in combination with a separator into a conventional jelly-roll configuration. The electrolyte may be introduced into the housing 12 either before or after insertion of the assembled coiled electrode structure 14. An insulating washer 18 is placed at the bottom end 20 of the housing 12 to insulate the housing bottom from the coiled electrode structure 14. The cover plate 16 seals the assembly 10 and is insulated from the housing 12 by a gasket 21. The battery housing 12 is electrically connected to one electrode strip of the coiled electrode structure 14 to serve as one battery terminal whereas the cover plate 16 is electrically connected to the other electrode strip of the electrode structure 14 to serve as the opposite battery terminal.

The coiled electrode structure 14 includes a positive electrode strip 22 and a negative electrode strip 24 separated from one another by a porous separator 26. The porous separator 26 can be of any conventional separator material suitable for alkaline cell systems such as, for example, non-woven nylon fibers. Moreover, the separator 26 can be a single sheet interposed between the strips of electrode material 22 and 24 respectively, or can be two or more separating sheets or preferably, and as is shown more clearly in FIG. 2, two sheets stitched, thermally bonded or tacked together along the opposite longitudinal boundaries, to form a sheath with the strips of electrode material 22 and 24 spaced apart and contained therein.

At least one terminal lead or tab is used to electrically couple each strip of electrode material to its corresponding battery terminal. The terminal leads are relatively short conducting tab elements in the form of thin strips of any suitable configuration, preferably rectangular, and selected from a material which will be compatible with the particular electrochemical system of the battery assembly, e.g., in a nickel cadmium cell the tabs should be nickel.

Figure 2:
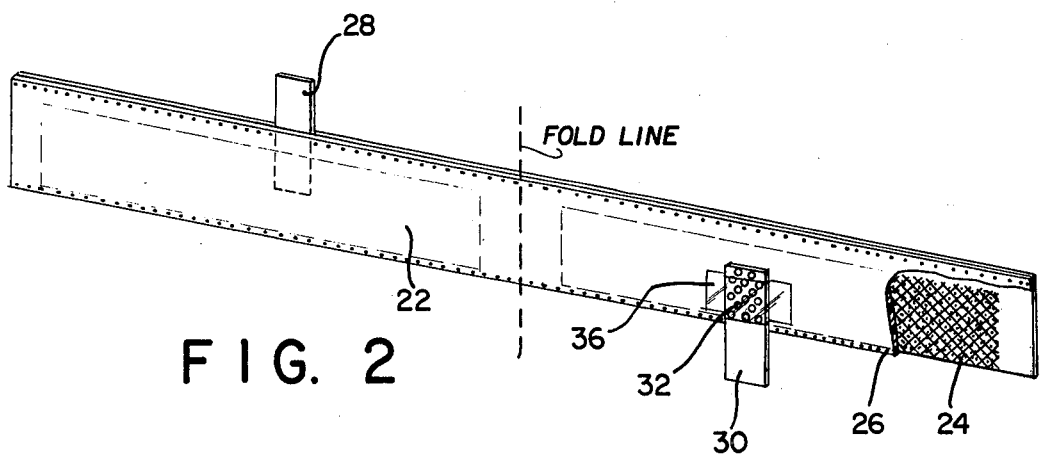
FIG. 2 is a perspective view of the uncoiled strips of electrode material for the battery assembly of FIG. 1 showing the strips within a sheath of porous separating material, one strip being connected to a tab element of the present invention.

As shown in FIG. 2, the conducting tab element 28 is connected to the positive strip of electrode material 22 whereas the conducting tab element 30 is connected to the negative strip of electrode material 24. As least one of the conducting tab elements 28 or 30, preferably element 30, or both elements, includes a multiplicity of projections 32, as is more clearly illustrated in FIGS. 3 and 4, for establishing simultaneous mechanical and electrical engagement to the strip of electrode material to which it is applied. The other conducting tab 28 may be connected in a conventional manner to its corresponding strip of electrode material 22.

The geometry, curvature and height of the projections 32 and the method of their formation are not critical to the present invention. However, for any given type of strip electrode, one particular kind of projection may be favored over another. Moreover, where the tab element is to be connected to the strip of electrode material through the intervening separator this may also favor one kind of projection over another. For example, when the strip of electrode material is the negative electrode in a nickel-cadmium cell and is fabricated using the pressed powder technique described in U.S. Pat. Nos. 3,310,437 and 3,432,351 respectively, it is preferred to use a multiplicity of projections 32 representing the jagged burrs resulting from corresponding perforations 34 formed in the tab element 30. The perforations 34 can be made using any suitable conventional tool, punch press, etc., and need only be confined to a predetermined surface section of the tab element to be placed in abutting relationship with the strip of electrode material 24 or against the covering separator 26. Relatively minor pressure is necessary to firmly establish the connection between the tab and the strip of electrode material. This pressure can be directly and immediately applied upon appropriate placement of the projections against the strip or subsequently applied by compression when the rolled electrode structure 14 is inserted, under pressure, into the battery housing 12. Other forms of projections 32 would be metal bristles, teeth, pointed protrusions, etc., extending from one of the tab surfaces.

The number of projections 32 and their proximity to one another are not critical although as indicated heretofore there may be a preferred arrangement depending upon the strip electrode manufacturing technique. For example, for the nickel cadmium cell, it is preferred that the negative electrode be made using the pressed powder technique in which the active electrode material is compacted against a metal current carrying grid which is of open mesh construction. For such electrode the perforated tab projections 32 are preferred and should be of a sufficient number to permit multiple contact with the metal grid in order to assure an electrical conductivity comparable to a welded joint.

Figure 5:
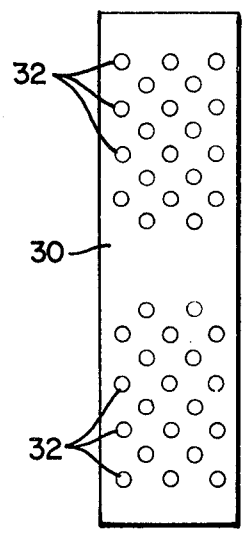
FIG. 5 is a plan view of a modified conducting tab element of the present invention.

Once the tab elements 28 and 30 are in place an adhesive covering 36 of insulating material may be placed over the section of the tab element 30 in which the perforations 34 were made to secure the tab until the electrode is coiled. Covering 36 need only be a piece of self-adhesive plastic film, or a film over a layer of adhesive. The size of the insulated covering 36 should be sufficient to cover the area of the tab 30 containing the perforations with enough overlap to give adhesion to the electrode or separator surface. Covering 36 may be omitted if adhesive is applied between the tab and the electrode or separator surface, or if the projections are pressed firmly into the electrode strip. Lastly, after the tabbed electrode strips are wound to form the electrode assembly 14, the tab elements 28 and 30 are connected to the cover plate 16 and housing 12 of the battery assembly 10 in a conventional manner with the tab element 28 secured to the cover plate 16 and the tab element 30 bent back upon the assembled coiled electrode structure 14 for making a pressure contact with the battery housing 12. In the alternative configuration of FIG. 5 the tab element 30 has a double set of projections 32, 32 provided at each opposite end thereof, with one set of projections 32 intended for engaging the electrode strip as explained heretofore and with the opposite set of projections intended to engage the outer wrap of the same electrode strip upon bending the tab 30 under the electrode assembly 14 as shown in FIG. 1 with the smooth back side of the perforated area pressed against the battery housing. This alternative design will be effective only in limited cases where the electrode strip is on the outer wrap of the jelly-roll coiled electrode structure 14 and where the battery cell contained 12 provides an accessible uninsulated region adjacent to the tab.

Figure 6A:
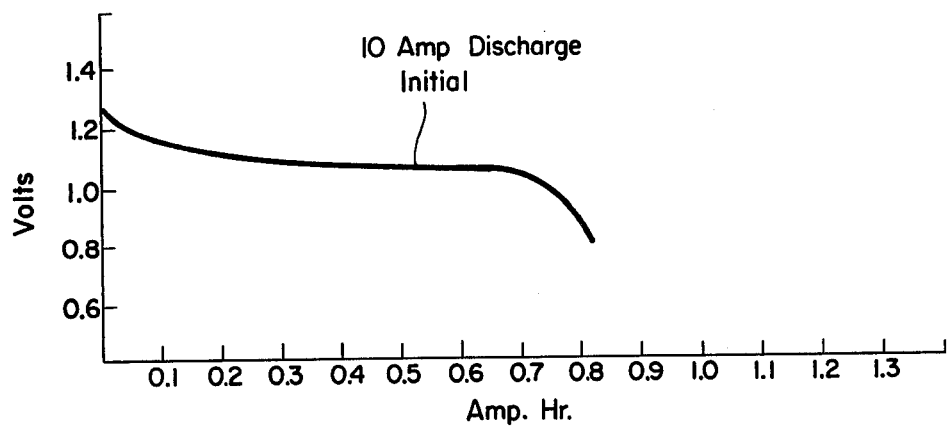
FIGS. 6 (a-c) are graphical presentations which indicate the cell performance of a nickel cadmium Sub C cell using the tab connections of the present invention.
Figure 6B:
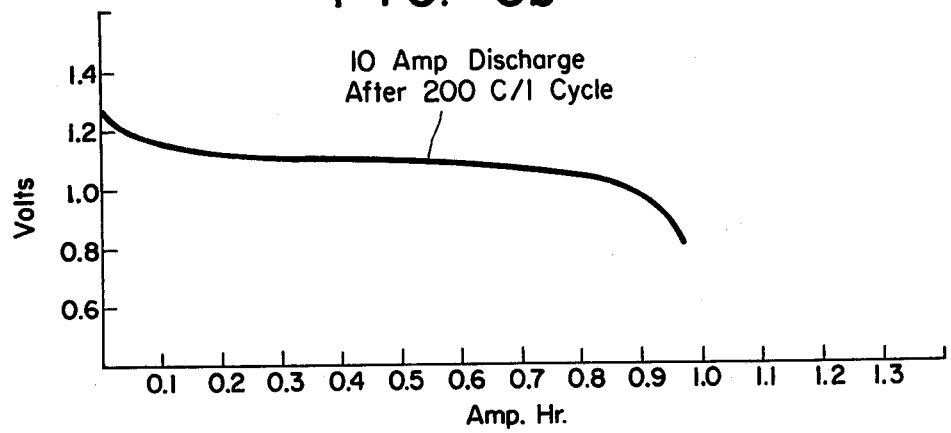
Figure 6C:
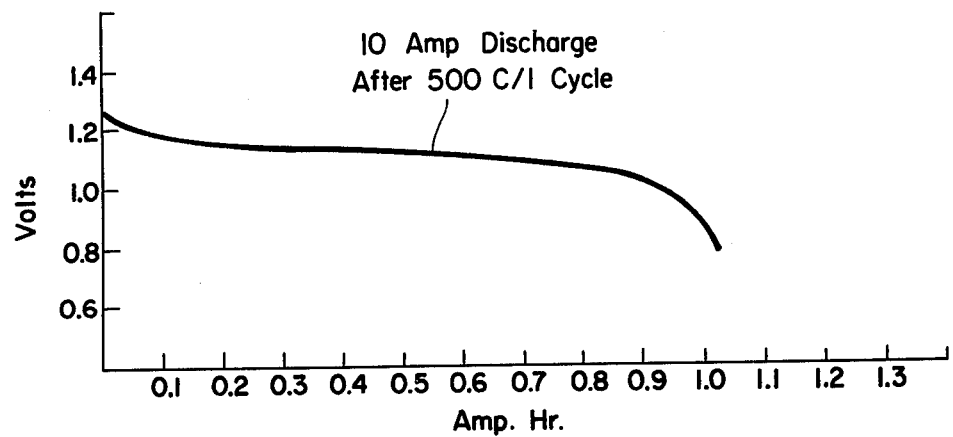

The connection made by the tab element 30 with a negative pressed powder electrode strip 24 when measured at 1000 Hz, 1 ampere, in a NiCd 1.2 Ah "Sub C"cell, exhibited from approximately 0.0093 to 0.0137 ohms total range in impedance. The voltage maintenance during discharge of a cell using a tab element 30 will approximate that of the welded tab connection at 10 and 20 ampere discharges respectively. FIG. 6(a-c) indicates the performance of the foregoing NiCd cell at 10 amperes discharge showing a flat voltage response throughout the cycle life of the cell. Although, the equivalent performance curves using welded tabs are not shown they would essentially overlap the curves of FIG. 6.

Although only one tab element has been shown and described for each strip electrode, it is obvious that multiple tabs can be incorporated and arranged in tandem along the length of the electrode strip to reduce voltage drop normally resulting from longitudinal current flow through the strip.

Conductive metal tabs with projections may be employed essentially as described to make low resistance mechanical and electrical contacts to electrode strips or plates. The electrodes may be of the pressed powder or pasted type on a conductive grid or screen, or may be of the impregnated porous metal sinter type. The tab may be applied to the bare electrode surface or may be applied after the separator so the projections penetrate the separator and the electrode beneath. The projections are of sufficient depth and number as to insure that a substantial number will contact portions of the grid, screen or sinter as well as the active electrode material.

Mechanical stability of the contacts is insured in the jelly-roll construction by the tight fit of the jelly-roll in the cylindrical housing. Tab contact by means of projections may also be utilized with flat plate batteries provided end pressure is maintained on the electrode stack.

It should be appreciated that although the invention is directed to a battery assembly incorporating a mechanical pressure tab connection equivalent to a welded connection, the same general approach can be utilized but to a lesser degree for applications where current drains are very light, e.g., fewer or smaller projections may be employed, roughened surfaces may be employed to contact the bare electrode surface in place of large projections, and the like.

What is claimed is:

1. In a cylindrical battery assembly, including at least one galvanic cell enclosed within an outer housing having a positive and negative battery terminal and a supply of electrolyte, comprising:
   a strip of negative electrode material composed of a conductive metal and electrochemically active material;
   a strip of positive electrode material;
   a porous separating member for maintaining the positive and negative electrode strips spaced from one another, with the strip of positive and negative electrode material being spirally wound in combination with said porous separating member into a cylindrical form; and
   means for electrically coupling said positive and negative strip of electrode material to the corresponding positive and negative terminal of said outer housing, the improvement comprising;
   wherein said means for electrically coupling at least said negative strip of electrode material to its corresponding housing terminal comprises at least one conductive element having a multiplicity of projections which penetrate into said electrode for mechanically joining said element to said electrode and for simultaneously establishing electrical contact with said conductive metal in said strip of negative electrode through the mechanical points of contact provided by said projections.

2. In a battery assembly as defined in claim 1 wherein said conductive element has a planar surface from which said multiplicity of projections extend.

3. In a battery system as defined in claim 2 wherein said porous separating member is in the form of a sheath surrounding said negative strip of electrode material and wherein said conductive element is disposed in abutting relation against said sheath with its multiplicity of projections extending through said sheath.

4. In a battery assembly as defined in claim 3 wherein said conductive element is a relatively thin tab of conductive material compatible with the electrochemical system of said battery assembly and further comprised a multiplicity of perforations formed upon one surface thereof, with said multiplicity of projections representing the jagged edges protruding from each of said multiplicity of perforations respectively.

5. In a battery system as defined in claim 4 wherein said multiplicity of perforations are arranged within a first predetermined section of said tab of conductive material.

6. In a battery system as defined in claim 5 comprising another multiplicity of perforations arranged within a second predetermined section of said tab of conductive material.

7. In a battery assembly as defined in claim 4 further comprising a plurality of said conductive elements arranged in tandem along the longitudinal axis of said negative strip of electrode material.

8. In a battery system as defined in claim 5 further comprising an insulating layer mounted over at least said first predetermined section of said strip of conductive material.

* * * * *